United States Patent [19]
Atkinson et al.

[11] Patent Number: 5,910,228
[45] Date of Patent: Jun. 8, 1999

[54] APPARATUS FOR COVERING A TEXTILE DYE TUBE

[75] Inventors: Leon Eric Atkinson, Siler City; Joseph Stanley Taylor, Asheboro; Paul Hier Miller, Greensboro, all of N.C.

[73] Assignee: Technimark, Inc., Asheboro, N.C.

[21] Appl. No.: 08/852,750

[22] Filed: May 7, 1997

Related U.S. Application Data

[63] Continuation-in-part of application No. 08/646,614, May 8, 1996, Pat. No. 5,785,801.

[51] Int. Cl.$^6$ .............................. B32B 31/00; B65H 81/00
[52] U.S. Cl. ......................... 156/450; 156/446; 156/449; 156/455; 156/458
[58] Field of Search ..................................... 156/215, 218, 156/285, 446, 449, 450, 455, 458; 242/118.11; 68/198; 210/494.1; 8/155, 155.1, 155.2

[56] References Cited

U.S. PATENT DOCUMENTS

| | | |
|---|---|---|
| 2,621,823 | 4/1952 | Perry . |
| 3,577,293 | 5/1971 | Ritterhoff . |
| 3,764,425 | 10/1973 | Neff et al. ............................... 156/218 |
| 3,778,321 | 1/1974 | Abbott . |
| 4,134,782 | 1/1979 | Straughan ........................... 156/203 X |
| 4,181,274 | 1/1980 | Burchette, Jr. . |
| 4,385,480 | 5/1983 | Burchette, Jr. . |
| 4,555,296 | 11/1985 | Burtch et al. . |
| 4,581,083 | 4/1986 | Schutz et al. . |
| 4,621,508 | 11/1986 | Baxley, Jr. et al. . |
| 4,702,433 | 10/1987 | Gilliam et al. . |
| 5,217,562 | 6/1993 | Macchiarulo et al. . |
| 5,445,335 | 8/1995 | Hallmann et al. . |

*Primary Examiner*—Jeff H. Aftergut
*Attorney, Agent, or Firm*—Rhodes Coats & Bennett, L.L.P.

[57] ABSTRACT

An apparatus for securing a sheet of filter material about the circumference of a dye tube. The apparatus includes a mandrel support table having a tube loading station, a sheet wrapping station, a sealing station, and a discharge station; hollow, air permeable mandrels supported on the table; a table drive to sequentially index the mandrels to each of the stations; a vacuum chamber extending from the tube wrapping station to the sealing station to draw a vacuum inside each mandrel at and between the wrapping and sealing stations; a tube feeder for feeding tubes onto mandrels at the tube loading station; a sheet feeder for feeding sheets of filter material into engagement with tubes at the wrapping station; a mandrel drive for rotating each mandrel at the wrapping station to wrap the sheet around the circumference of a tube supported on the mandrel; and a sealer at the sealing station for sealing the sheet to itself to cover the tube. In one embodiment the sealer is a heated roller which wraps and seals the sheet around the tube simultaneously in a single operation.

13 Claims, 7 Drawing Sheets

APPARATUS FOR COVERING A TEXTILE DYE TUBE

CROSS-REFERENCE TO RELATED APPLICATION

The present application is a continuation-in-part of U.S. patent application No. 08/646,614, filed May 8, 1996 (now U.S. Pat. No. 5,785,801, issued Jul. 28,1996).

BACKGROUND OF THE INVENTION (1) Field of the Invention

The present invention relates generally to dye tubes for textiles and, more particularly, to a method and apparatus for securing a sheet of filter material around a yarn tube of the type used as a carrier during dyeing or finishing.

(2) Description of the Prior Art

Yarn is commonly wound around a supporting tube or carrier in preparation for dyeing or finishing. A plurality of yarn carrying tubes are then positioned onto a spindle and immersed in a dye bath or other treatment bath. The tubes also may be axially compressed on the spindle to permit increased loading and improved uniformity of dye penetration by reducing the tension of the yarn on the package.

Modern dye tubes are normally formed of a molded plastic, such as polypropylene, and have a plurality of peripherally extending ribs and/or rings, often of a circumferential or helical configuration, connected by flexible joining members. The ribs and/or rings and joining members together form an open structure permitting dye or other liquids to enter the yarn from the hollow interior of the dye tube. Such tubes are shown in U.S. Pat. Nos. 4,702,433 and 5,445,335, the entire disclosures hereby incorporated by reference.

These perforated dye tubes may be covered with a permeable sleeve or covering to filter the dye bath before the bath contacts the yarn and to help prevent the yarn from being trapped in the compressed tube. Historically, this sleeve was formed of paper. However, since most dye tubes are now recycled after use, the sleeve can of the same general chemical composition as the tube. For example, the tube may be of injection molded polypropylene and the sleeve may be formed of a sheet of spun-bonded, nonwoven polypropylene fibers.

Since dye tubes are subjected to physical stress and high temperatures during use, it is necessary to ensure that the sleeve is securely fastened about the circumference of the dye tube. In addition, the sleeve must by positioned around the tube in an rapid and economical manner.

U.S. Pat. No. 4,385,480 to Burchette, Jr., and U.S. Pat. No. 4,621,508 to Baxley, Jr., are examples of prior art methods and apparatus for wrapping a sleeve around a dye tube, the entire disclosures hereby incorporated by reference. Generally, the technique described in these patents involves feeding tubes positioned end-to-end along an axial pathway while rotating the tubes. A continuous band of covering material is then fed along an angular path to the tubes at a covering station, where the band is wrapped in a spiral about the tubes with the edges of the band being overlapped.

The covering is then adhered to itself and to the tube at the overlap of the sheet edges to form the sleeve. In the Burchette, Jr. patent, the covering material is paper, and the adhesion is achieved with heat and glue, while the covering is the Baxley, Jr. patent is spunbonded, nonwoven polypropylene and the adhesion is with ultrasonic welding without glue. The band is then cut at the joinder of the tubes to form the finished product. Heating and gluing is complicated and ultrasonic welding is expensive but Baxley, Jr specifically taught that heating alone could not be used to provide adequate sealing of the edges of the sheet.

Thus, a need exists for a method and apparatus for securely attaching a covering to the outer surface of a dye tube in a rapid and economical manner while, at the same time, does not require the use of glue or ultrasonic welding and overcomes the problems of using heat to seal the fabric edges.

SUMMARY OF THE INVENTION

The present invention is directed to a method and apparatus for covering a dye tube with a permeable covering, and to the resultant product. In the preferred embodiments, the invention includes a mandrel for supporting a dye tube; a sheet feeder positioned to convey a sheet of filter material to a dye tube carried on the mandrel; wrapping means from wrapping the sheet about the circumference of the tube; and sealing means for bonding the sheet to itself and to the tube.

Also, in the preferred embodiments, the sheet is of a rectangular shape with leading and trailing edges spaced at a distance greater than the circumference of the tube, so that the leading and trailing edges of the sheet will overlap when the sheet is wrapped around the tube circumference. During feeding, the sheet is positioned with the leading edge parallel to the axis of the tube. Thus, when the sheet is wrapped around the tube, the overlapping edges of the sheet or seam will be parallel to the axis of the tube.

In order to achieve rapid and economical production the above apparatus may further include a tube feeder for feeding tubes to the mandrel and a tube unloader for removing covered tubes from the mandrel.

The mandrel used to support the dye tube during wrapping includes a continuous air permeable cylindrical wall with a covered distal end. A vacuum means communicates with the mandrel interior to draw air inwardly through the mandrel perforations, and thus the wall of the tube positioned on the mandrel to draw the sheet against the outer circumference of the tube. A drive means is also provided to rotate the mandrel during wrapping.

The invention may also include a turntable having a mandrel support table with a tube loading station, a sheet wrapping station, a sealing station, and a discharge station; at least one hollow, air permeable mandrel supported on the table; table drive means for indexing the mandrel sequentially to each of the stations; and a vacuum chamber extending from the tube wrapping station to the sealing station, the vacuum chamber drawing a vacuum inside the mandrel at and between the wrapping and sealing stations.

The apparatus may further include a tube feeder for feeding tubes to the tube loading station; a sheet feeder for feeding sheets of filter material to the wrapping station; and a sealer at the sealing station for sealing the sheet around the circumference of the tube. A mandrel drive means is also provided in one preferred embodiment for rotating the mandrel at the wrapping station to wrap the sheet around the circumference of the tube, and a locking means is provided to prevent the mandrel from rotating when the mandrel is indexed from the wrapping station to the sealing station.

In one of the preferred embodiments, the mandrel support table rotates about a central axis and has four mandrels equally spaced around the periphery of the table and rotatably secured to the table at their inner ends. In another preferred embodiment, four pairs of freely rotatable mandrels are carried on the table. However, a lesser or greater number of mandrels is contemplated by the present invention. Table drive means is provided to sequentially index the table to bring each mandrel to successive stations. Preferably, the table is positioned to rotate in a vertical plane about a horizontal axis, with each mandrel being positioned to extend horizontally from the table.

The tube feeder used to convey tubes to the mandrel includes a tube conveyor, such as an inclined surface, for moving tubes to the tube loading station, and an ejector adapted to eject a tube from the conveyor onto the successive mandrels when the mandrels are indexed to the tube loading station.

The sheet feeder includes a conveyor having a continuous, air permeable, sheet support belt with a discharge end at the tube wrapping station. A vacuum source in located beneath the surface to draw a vacuum through the upper, horizontal belt surface, and thus hold sheets carried thereon in position. The sheet feeder further includes a supply roller for supporting a roll of filter material, a draw roller for continuously withdrawing a band of filter material from the roller, and a cutter for cutting the filter material into sheets or units of the desired size and shape.

The sealing means in one preferred embodiment is adapted to engage the overlap or seam after the seam is wrapped around the tube, and while the sheet is held in position by the vacuum. The sealer in this embodiment includes a sealing bar adapted to engage the overlapped portion of the covering. An actuator may be used to move the bar between a retracted position away from the wrapped tube and an extended position engaging at least a part of the seam.

Many of the tubes that can be covered in accordance with the present invention include spaced peripherally extending ridges or ribs which may be separated by axially spaced rings. When covering these tubes, the bar may positioned to contact the covering seam or overlapping edges of the sheet on the ridges and/or rings. The surface of the bar contacting the tube covering may be of different configurations. For example, the bar may be have discontinuous projections or teeth, so that the bar only contacts the overlapping edges of the sheet at a plurality of spaced areas on the ribs and/or rings. Alternatively, the bar surface may have a convex or concave radius to provide a lesser or greater contact with the tube covering.

The sealing means also includes a power source, such as a heater, to impart energy to the overlap and tube areas beneath the bar, and thereby melt a part of the overlapping edges of the sheet and tube sufficient to produce a sealing bond.

In the practice of the method of the invention, a sheet of filter material is secured around the circumference of a cylindrical tube by the steps of providing a cylindrical tube having a continuous, air permeable, outer circumference and a hollow interior; providing a sheet of filter material having parallel leading and trailing edges, the edges being spaced at a distance greater than the circumference of the tube; drawing a vacuum within the interior of the tube while feeding the leading edge of the sheet into engagement with the tube circumference, the leading edge being axially aligned with the tube; wrapping the sheet around the circumference of the tube with the edges being overlapped; and sealing the edges of the sheet to each other and to the tube. The sheet may be wrapped around the tube by rotating the tube while the sheet is being fed. Alternatively, the covering sheet may be sealed at selected locations around the periphery of the tube.

It has surprisingly been found that the performance of the cover sheet is significantly improved when the cover is wrapped counter-clockwise, i.e. in the opposite direction to the direction the yarn is normally wrapped, so that the yarn, when unwrapped from the tube will be unwrapped in the same direction as the overlap, significantly reducing snagging of the yarn on the overlapping edges of the covering sheet.

In one of the preferred embodiments, the tube is wrapped at a first station and the edges and tube are adhered at a second station, with the tube being moved from the first station to the second station while maintaining a vacuum within the interior of the tube. The method also includes the step of cutting the sheet from a roll of filter material and conveying the sheet to the tube.

Instead of wrapping the tubes at one station and then indexing the tubes to another station for sealing of the sheets onto the tubes, it is within the scope of the invention to seal the tubes at the same position where they are wrapped. The sheet can be also be sealed to the tube at various other locations on the tube in addition to sealing along the sheet overlap.

For example, instead of using a heated bar as described above, a heated roller can be brought into engagement with the surface of the tube, and rotated to rotate the tube, sealing the covering to the tube about selected areas of the entire tube periphery. The use of a heated roller in this manner also makes it unnecessary to use separate drive means to rotate the mandrels, since the heated sealing roller rotates the tube as the roller turns.

The heated roller, instead of having a uniform surface can include peripherally extending ridges, i.e., circumferential or helical ridges, corresponding to and aligned with the axially spaced rings of the tube. With this configuration, the heated roller only engages and seals the parts of the covering over the tube rings. This alternative has several advantages.

First, contacting covering material that is not supported over a part of a tube tends to melt, forming holes, if the sealing temperature is sufficiently high. Thus, a sealing means that only contacts supported parts of the covering can be operated at a significantly higher temperature, requiring less time for sealing. This also better allows "cold" parts which have been out of the mold for long enough to harden to be more easily wrapped and bonded.

Second, sealing of the covering to the tube entirely around the circumference of the tube reduces slippage of the covering during winding. However, when the sealing is only on the rings, the covering between the rings is not distorted or torn when the tube is compressed, since the covering is not joined to the flexible joining members being distorted during compression.

An apparatus constructed to circumferentially seal the covering to the tube can be constructed using an apparatus similar to that described above, with the primary distinction being in the construction and operation of the sealing means. That is, the apparatus is comprised of a turntable for supporting a plurality of mandrels that are indexed to tube loading, wrapping, sealing and tube unloading stations.

However, the wrapping and sealing stations, instead of being at separate positions, are located together at a single position on the turntable, so that the tubes are loaded at a first station, wrapped and sealed at a second station, and unloaded at a third station. Wrapping and sealing a tube simultaneously at a single position significantly reduces cycle time from about 8 to 3 seconds! The tube loading and unloading stations can be constructed much like the loading and unloading stations in the preceding embodiment. Also, the sheet feeder can be much the same. However, the wrapping and sealing stations, similar in some elements and broadly directed to the same functions, are significantly different in other aspects from the preceding example.

Specifically, while the wrapping and sealing station of this embodiment includes a transfer roller to vacuum transfer a sheet from the conveyor to a tube carried on a rotatable, perforated mandrel connected to a vacuum source, the mandrel is not driven. Instead, rotation of the mandrel and the tube carried thereon, and sealing of the cover to the exterior of the tube, is accomplished with a heated roller.

The heated roller is positioned on a reciprocating support parallel to the mandrel carrying the tube, so that the roller can be brought into engagement with the tube for tube rotation and covering sealing, and removed for indexing of a new tube into position. When a sheet is transferred from the transfer roll to the tube, the rotating roller is lowered to contact and rotate the tube, wrapping the cover around the tube and overlapping the leading edge of the sheet with the trailing edge. While the sheet is being wrapped, the heated roller also fuses the sheet to the tube where the sheet is nipped between the roller and the tube. As a result, the sheet is sealed at several points about the circumference of the tube, substantially eliminating slippage during use.

The heated roller is of a length approximating the length of the sheet being wrapped onto the tube. The circumference of the roller, while not critical to the invention, will normally be from about 2 to about 4 times the circumference of the tube in order to provide rapid wrapping and heat transfer. The material used to construct the roller should provide rapid heat transfer without scratching or sticking to the cover. A suitable roller can be formed of aluminum with a Teflon® coating.

The roller preferably includes peripherally extending ridges, e.g., circumferential or helical ridges, corresponding to the rings on the tube being wrapped. For example, the roller may have circumferential ridges with center spaced at one-half inch, when sealing a cover to a tube that has circumferential rings of about the same spacing. The width of the roller ridges should also approximate the width of the tube rings, so that the roller ridges do not extend significantly beyond the edges of the tube rings.

In operation of this embodiment, a tube loaded onto a mandrel at the tube loading station is indexed to the wrapping and sealing station. At the same time, covering material is cut into rectangular sheets and conveyed into engagement with the transfer roller, which is rotated in a counter-clockwise direction, when viewed from the front of the apparatus. A vacuum drawn on the interior of the transfer roller lifts the sheet from the conveyor and carries it into engagement with the periphery of the tube, where the sheet is drawn against the tube by a vacuum inside the mandrel.

The heated sealing roller is then lowered into contact with the tube while being rotated in a counter-clockwise direction, thereby also rotating the mandrel and tube in a clockwise direction, and carrying the cover around the tube. As the covering is nipped between the surfaces of the tube and the heated roller, the nipped portions of the covering are fused or melted onto the tube on the tube rings, while the covering segments between the ridges are unaffected. Thus, when wrapping of the sheet is completed, the leading and trailing edges of the sheet overlap and the cover is sealed to the tube at a plurality of spaced circumferential bands around the tube. The wrapped and sealed tube is then indexed to the discharge station for removal from the mandrel.

Accordingly, one aspect of the present invention is to provide an apparatus for covering a textile dye tube with a filter sheet. The apparatus includes: (a) a hollow mandrel for supporting the tube, at least a portion of the outer surface of the mandrel having a plurality of openings; (b) a vacuum source connected to the mandrel for drawing the sheet against the mandrel; and (c) sealing means for bonding the overlapping edges of the sheet to one another and to the tube.

Another aspect of the present invention is to provide an apparatus for attaching a thermoplastic filter sheet to a textile dye tube. The apparatus includes: sealing means for bonding the overlapping edges of the sheet to one another and to the tube, the sealing means including a heating bar movable between a retracted position and an extended position in contact with the sheet wrapped tube.

Another aspect of the invention is to provide an apparatus for attaching a thermoplastic filter sheet to a textile dye tube. The apparatus includes: sealing means for bonding the overlapping edges of the sheet to one another and to the tube, the sealing means including a heated roller movable between a retracted position and an extended position in contact with the sheet wrapped tube.

Still another aspect of the present invention is to provide an apparatus for covering a textile dye tube with a filter sheet. The apparatus includes: (a) a hollow mandrel for supporting the tube, at least a portion of the outer surface of the mandrel having a plurality of openings; (b) a vacuum source connected to the mandrel for drawing the sheet against the mandrel; (c) sealing means for bonding the overlapping edges of the sheet to one another and to the tube, the sealing means including a heating bar movable between a retracted position and an extended position in contact with the sheet wrapped tube; and (d) means for wrapping the sheet around the tube in a counter-clockwise direction with respect to the direction of yarn.

Still another aspect of the present invention is to provide an apparatus for covering a textile dye tube with a filter sheet. The apparatus includes: (a) a hollow, freely-rotatable, mandrel for supporting the tube, at least a portion of the outer surface of the mandrel having a plurality of openings; (b) a vacuum source connected to the mandrel for drawing the sheet against the mandrel; and c) sealing means for rotating the tube while bonding the overlapping edges of the sheet to one another and to the tube, the sealing means including a heating roller movable between a retracted position and an extended position in contact with the sheet wrapped tube.

These and other aspects of the present invention will become apparent to those skilled in the art after a reading of the following description of the preferred embodiment when considered with the drawings.

DESCRIPTION OF THE PREFERRED EMBODIMENTS

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
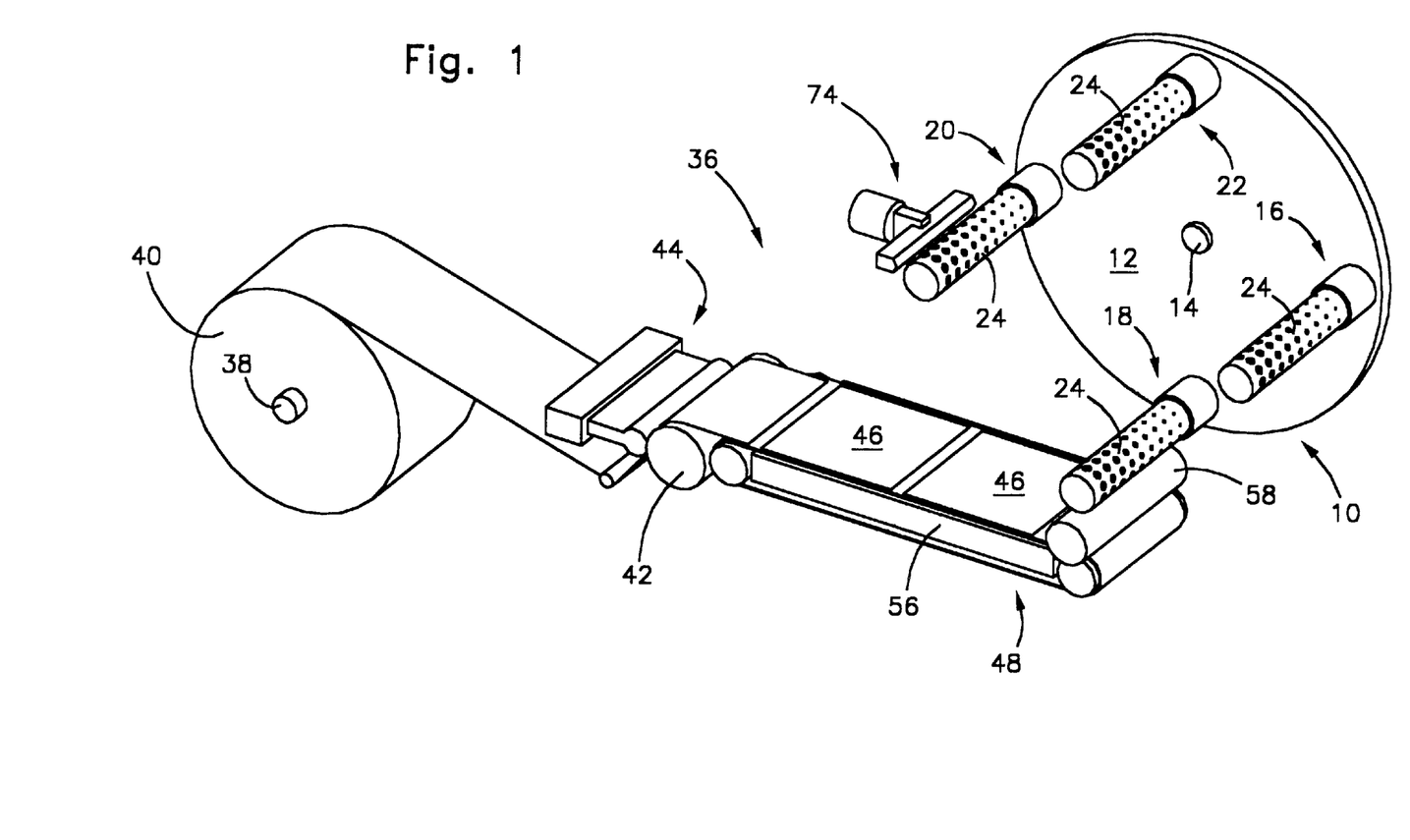
FIG. 1 is perspective view of an apparatus for covering a textile dye tube constructed according to the present invention with the supporting frame removed for clarity of illustration.
Figure 2:
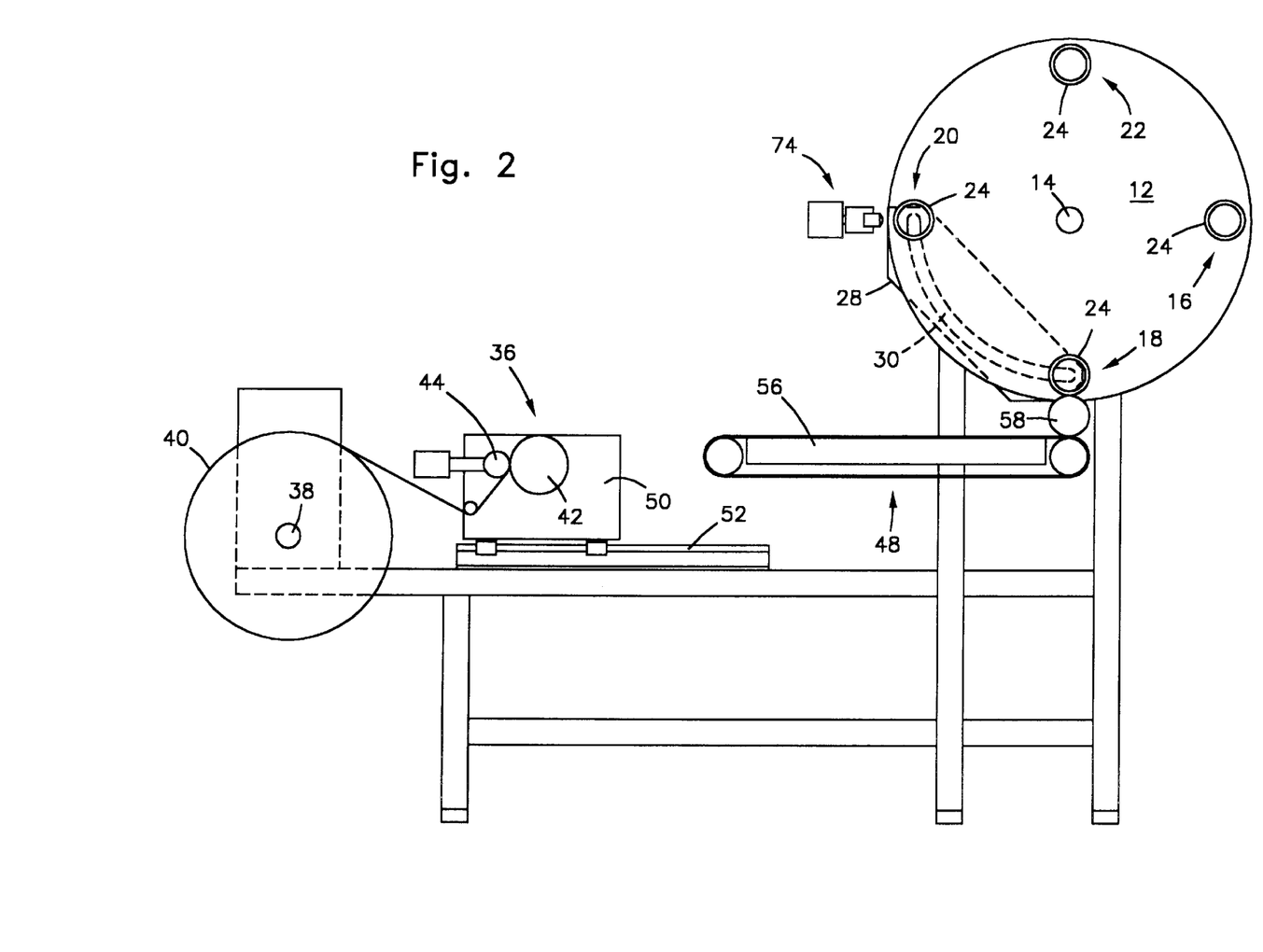
FIG. 2 is a side view of the apparatus shown in FIG. 1.

Referring now to the drawings in general and FIG. 1 in particular, it will be understood that the illustrations are for the purpose of describing a preferred embodiment of the invention and are not intended to limit the invention thereto. As best seen in FIGS. 1 and 2, an apparatus constructed according to the present invention is shown consisting of a turntable, generally 10; a sheet feeder, generally 36; and a cover sealer, generally 74.

Turntable 10 includes a rotatable, mandrel supporting table 12, positioned to rotate about a horizontal axle 14. Table 12 has equally spaced around its periphery, a tube loading station 16, a sheet wrapping station 18, a sealing station 20, and a discharge station 22. A hollow, air permeable mandrel 24, to be described in detail hereinafter, is shown supported at each station on table 12. Table drive means 26 is operatively associated with axle 14 to rotate table 12, thereby indexing the mandrels carried thereon sequentially to each of the stations.

Turntable 10 further includes a vacuum chamber 28 extending from behind sheet wrapping station 18 to sealing station 20. Vacuum chamber 28 is adapted to draw a vacuum inside mandrels 24 at and between wrapping station 18 and sealing station 20. Chamber 28 includes a channel 30 toward the back of table 12 along the pathway of mandrels 24 being indexed from wrapping station 18 to sealing station 20, providing a vacuum within mandrels 24 at and between stations 18 and 20.

A mandrel drive means 32 is positioned at the inner end of mandrel 24 to rotate a mandrel 24, when positioned at station 18, one revolution during wrapping. A mandrel lock 34 is positioned adjacent each mandrel position to prevent mandrel 24 from rotating when being carried on table 12 from station 18 to station 20.

Sheet feeder 36 includes a sheet roll support axle 38 for carrying a roll of cover sheet material 40, a sheet draw roller 42 for drawing continuous sheet from roll 40, and a reciprocal cutter 44 positioned adjacent to, and axially aligned with, draw roller 42, for periodically severing 40 into rectangular sheets 46. Conveyor 48 is positioned to receive sheets from draw roller 42. Draw roller 42 and cutter 44 are supported on a carrier frame 50 slidably positioned on bars 52 so that sheet feeder 36 can be withdrawn for ease of servicing.

Conveyor 48 includes a continuous foraminous band 54 having a horizontal upper surface. A vacuum chamber 56 is positioned beneath the upper surface of band 54, and is adapted to draw air down through the band surface to hold sheet units carried on the surface. A drive means, not shown, is provided to drive band 54 away from roller 42 and towards tube wrapping station 18.

Figure 3:
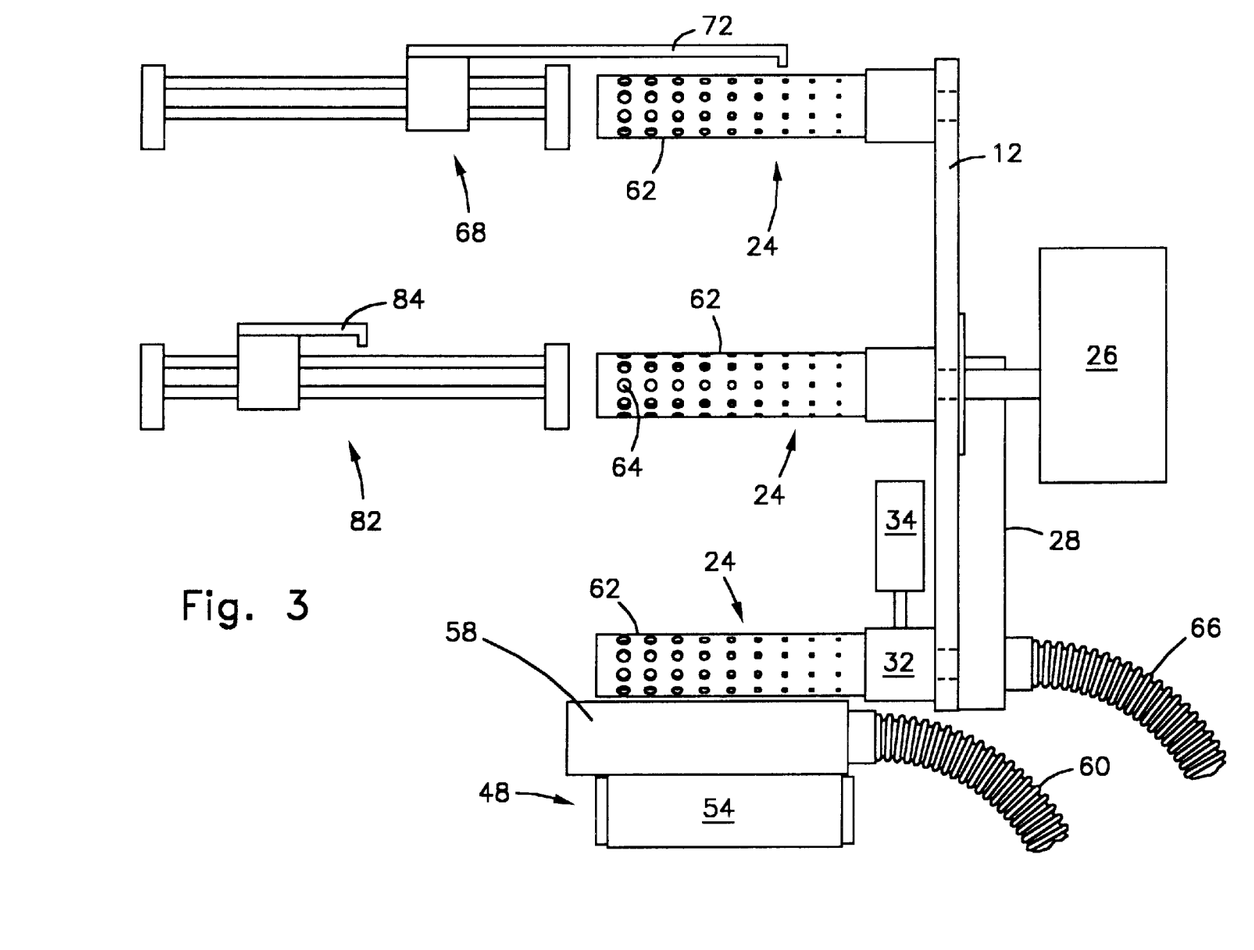
FIG. 3 is an enlarged end view of the mandrel supporting table, showing the positioning of the mandrels thereon, and the relationship of the cover conveyor to the sheet wrapping station.

A transfer roller 58 is positioned at the discharge end of conveyor 48 beneath station 18, and is adapted to transfer sheet 46 from conveyor 48 to mandrel 24. The interior of roller 58 communicates with a vacuum source, not shown, by way of vacuum line 60 and includes a porous surface so that sheets engaging exiting from conveyor 48 are held against roller 58 until engaging mandrel 24.

Mandrel 24 includes a continuous hollow cylinder 62 extending from a rotatably mounted, inner end toward table 12 to a free distal end. A plurality of axially aligned, spaced rows of perforations 64 extend through cylinder 62 into its interior. Perforations 64 increase in diameter from the inner end toward the distal end of cylinder 62, so that a uniform vacuum can be drawn on the surface of cylinder 62 when a vacuum is applied to the interior of the mandrel through vacuum line 66, extending to a vacuum source, not shown.

Tube feeder 68 is positioned adjacent tube loading station 16 for feeding tubes 70 onto mandrels 24 positioned at loading station 16. Feeder 68, which may be loaded with tubes by hand, or from a supply source, such as an inclined delivery surface, not shown Feeder 68 includes a tube pusher 72 to feed tubes 70 onto mandrel 24 at loading station 16.

Figure 4:
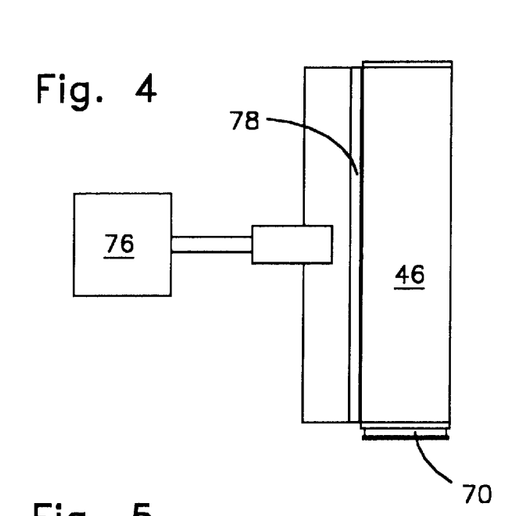
FIG. 4 is an enlarged top view of the cover sealer.
Figure 5:
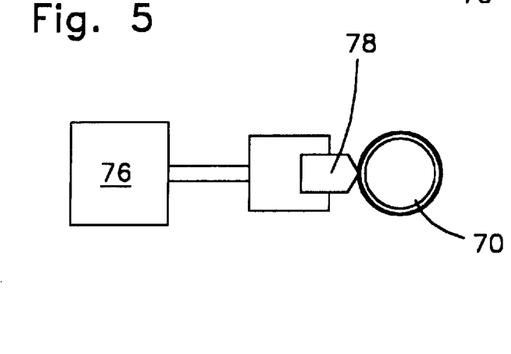
FIG. 5 is an enlarged side view of the cover sealer.
Figure 6:
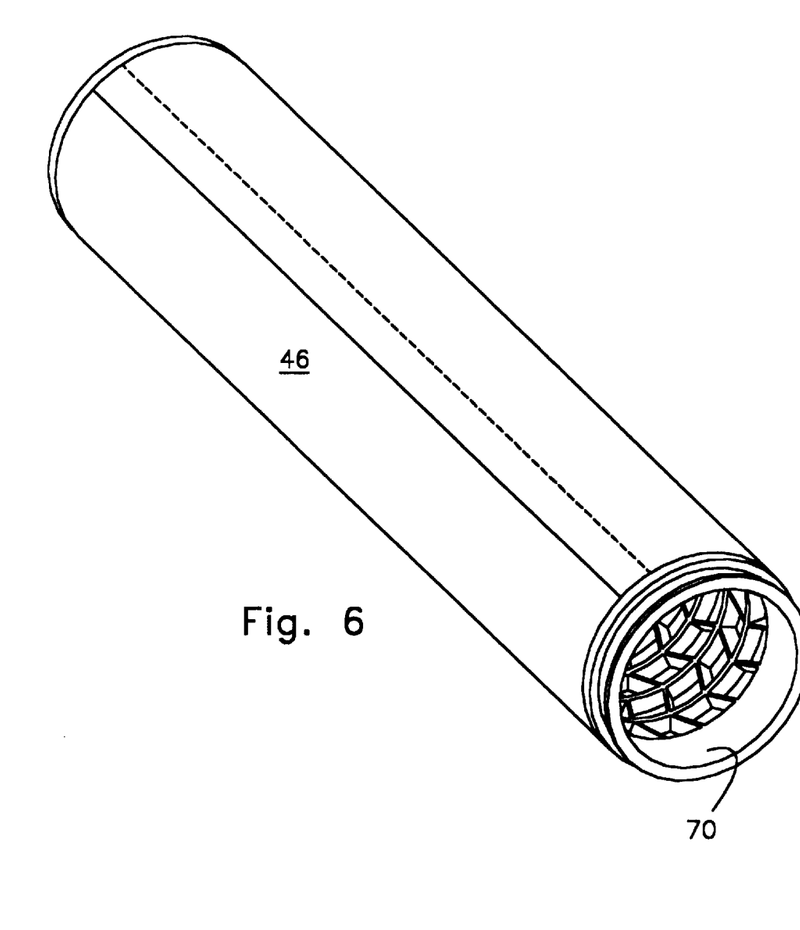
FIG. 6 is a perspective view of a dye tube with the cover sealed in place illustrating the covering wrapped in the opposite direction to the direction the yarn will be wrapped, thereby significantly reducing snagging of the yarn on the overlapping edges of the cover sheet when the yarn is unwrapped.

Cover sealer 74, positioned adjacent cover sealing station 20 includes an actuator 76 controlling sealing bar 78, which includes a contact edge 80 axially aligned with mandrel 24 at sealing station 20. Actuator 76 is designed to reciprocate bar 78 between a retracted position and an extended position whereat bar edge 80 engages the overlapping edges or seam of sheet 46 after sheet 46 is wrapped around tube 66, and while sheet 46 is held in position by a vacuum drawn into mandrel 24 by vacuum chamber 28. Sealer 74 also includes an energy source, not shown, such as a heater or ultrasonic power source, to impart energy to areas engaged by bar edge 80, and thereby melt a part of the overlapping edges of the sheet and tube sufficient to produce a sealing bond.

Tube unloader 82, positioned at tube discharge station 22, includes a tube retractor 84 positioned to withdraw covered tubes 70 from mandrel 24 at station 22. The covered tubes can then be discharged or carried to a desired location.

The construction of the filter sheet is not critical to the present invention, so long and the sheet is permeable to the dye bath, and prevents yarn from adhering to the dye tube. Desirably, the sheet is of the same chemical composition as the dye tube to permit recycling without separation of the sheet from the tube. The sheet may be of nonwoven fibers. Also, the sheet can be a perforated, film, e.g. a thermoplastic film, such as polypropylene, with perforations therein to permit entry of the dye bath.

Various type of tubes can be covered with the present invention, with mandrels of different lengths and diameters being positionable on the table to permit wrapping of different size tubes. Also, the width of the sheet material, and the frequency at which it is cut, can be adjusted.

Generally, the process of the invention comprises providing a cylindrical tube having a continuous, air permeable, outer circumference and a hollow interior; providing a sheet of filter material having parallel leading and trailing edges, the edges being spaced at a distance greater than the circumference of the tube; rotating the tube around its axis while drawing a vacuum within the interior of the tube and feeding the leading edge of the sheet into engagement with the tube circumference, thereby wrapping the sheet around the circumference of the tube with the edges being overlapped; and sealing the overlapping edges of the sheet to one another and to the tube while maintaining the vacuum.

In operation of the preferred embodiment illustrated in FIGS. 1–5, mandrels 24 are positioned at tube loading station 16, sheet wrapping station 18, sealing station 20, and discharge station 22. A dye tube 70 is positioned over mandrel 24 at loading station 16, and mandrel 24 with tube 70 thereon is then indexed to wrapping station 18. It is to be understood that the operation of the preferred apparatus, and thus the process, is continuous in nature. Therefore, during operation, different tubes will be loaded, wrapped, sealed and unloaded at the different stations at the same time, and then indexed to the next station.

At wrapping station 18, sheet 46 is fed into contact with tube 70 with the leading edge of sheet 46 parallel to the axis tube 70. Tube 70 is rotated one revolution to wrap sheet 46 around the periphery to tube 70, with the leading and trailing edges of sheet 46 overlapping. Sheet 46 is drawn against the periphery of tube 70 and held in place by drawing a vacuum into the interior of tube 70 during wrapping.

Tube 70, with sheet 46 wrapped thereon and held in position by a vacuum, is then indexed to cover sealing station 20, where at contact edge 80 of bar 78 engages the overlapping edges or seam of sheet 46 to melt at least a part of the overlapping edges of the sheet and tube sufficient to produce a sealing bond. When the structure of tube 70 includes a plurality of peripherally extending ridges or projections, the sealing bar edge 80 engages the surface of sheet 46 on these ridges to seal the overlapping edges of sheet 46 to one another and to tube 70 on the ridges.

Tube 70, with sheet 46, sealed thereon, is then indexed to tube discharge station 22, where tube 70 is retracted from mandrel 24. Empty mandrel 24 is then indexed to tube loading station 16 to again initiate the sequence.

FIGS. 7–10 illustrate another apparatus constructed according to the present invention that is comprised of a turntable, generally 100; a sheet feeder, generally 102; a tube loading station, generally 104; a wrapping and sealing station, generally 106, and a discharge station, generally 108.

Figure 7:
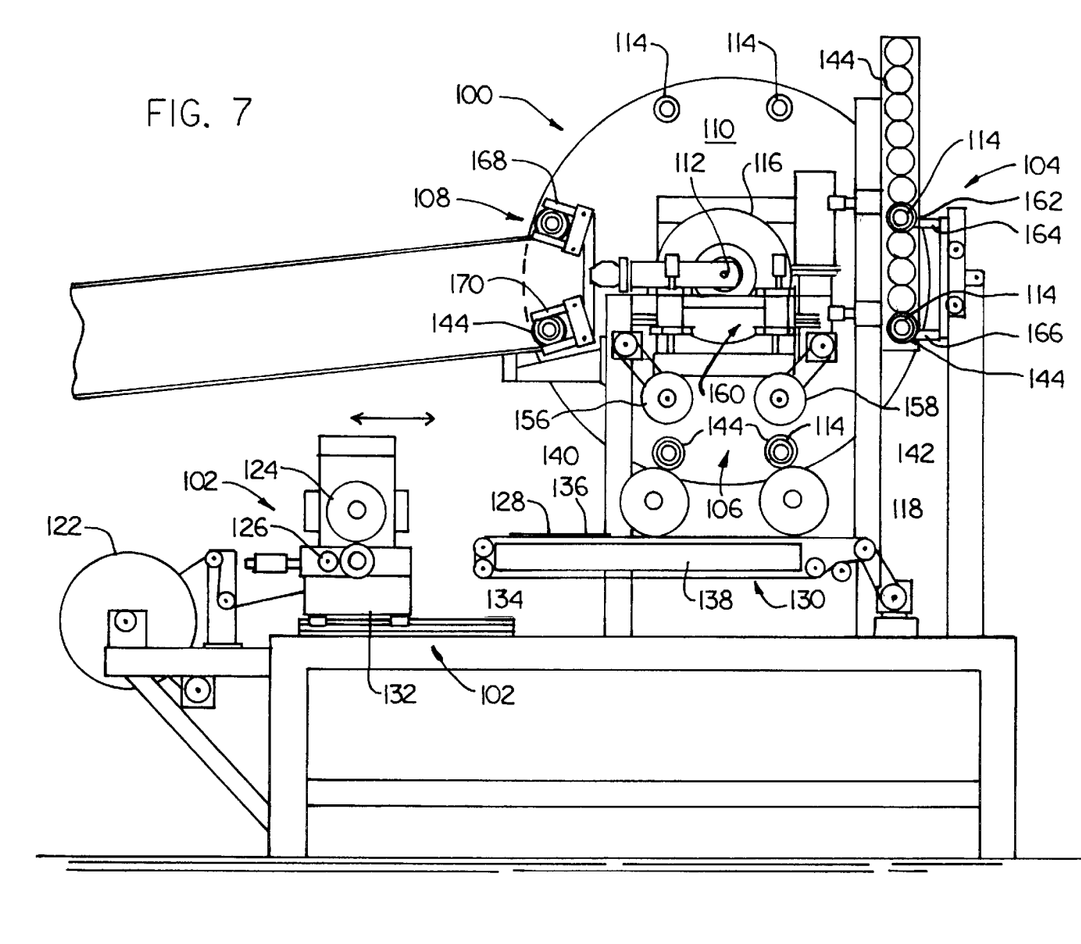
FIG. 7 is a side view of an another embodiment of the invention, using a combined wrapping and sealing station.
Figure 8:
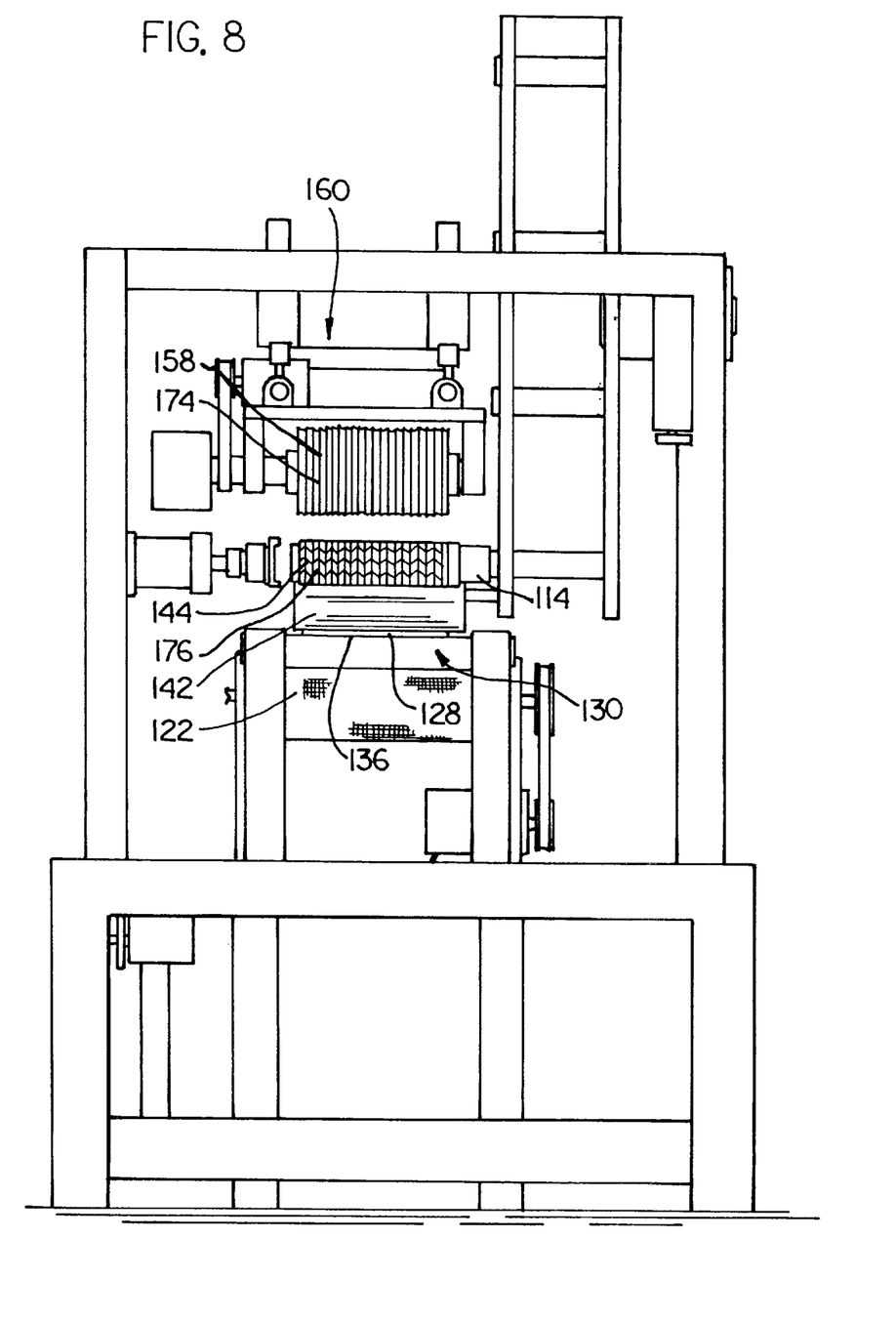
FIG. 8 is an end view of FIG. 7.

Turntable 100 includes a rotatable, mandrel supporting table 110, positioned to rotate about a horizontal axle 112. Table 110 has equally spaced around its periphery, four pairs of free-rotatable, hollow, air permeable mandrels 114 to be described in detail hereinafter. Table drive means 116 is operatively associated with axle 112 to rotate table 110, thereby indexing the mandrel pairs carried thereon sequentially to loading station 104, then to wrapping and sealing station 106, and then to discharge station 108. Turntable 100 further includes a vacuum chamber 118 connected to draw a vacuum inside each of mandrels 114 at wrapping and sealing station 106.

Sheet feeder 102 includes a sheet roll support axle 120 for carrying a roll of cover sheet material 122, a sheet draw roller 124 for drawing continuous sheet from roll 122, and a reciprocal cutter 126 positioned adjacent to, and axially aligned with, draw roller 124, for periodically severing roll 122 into rectangular sheets 128. Conveyor 130 is positioned to receive sheets from draw roller 124. Draw roller 124 and cutter 126 are supported on a carrier frame 132 slidably positioned on bars 134 so that sheet feeder 102 can be withdrawn for ease of servicing.

Conveyor 130 includes a continuous foraminous band 136 having a horizontal upper surface. A vacuum chamber 138 is positioned beneath the upper surface of band 136, and is adapted to draw air down through the band surface to hold sheets 128 carried on the upper surface. A drive means, not shown, is provided to drive band 136 away from roller 124 and towards wrapping and sealing station 106.

Figure 9:
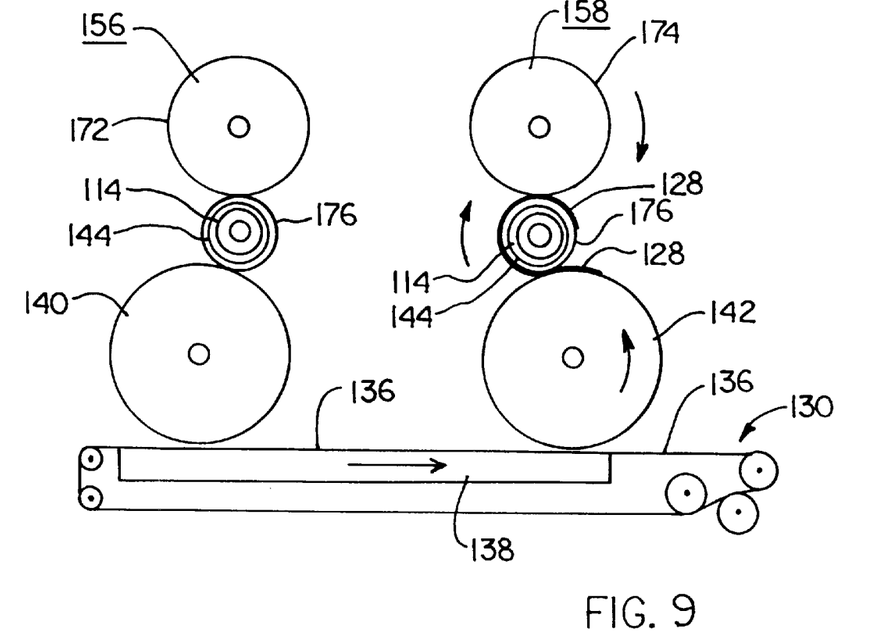
FIG. 9 is a detailed side view of the wrapping and sealing station, with a tube being wrapped.
Figure 10:
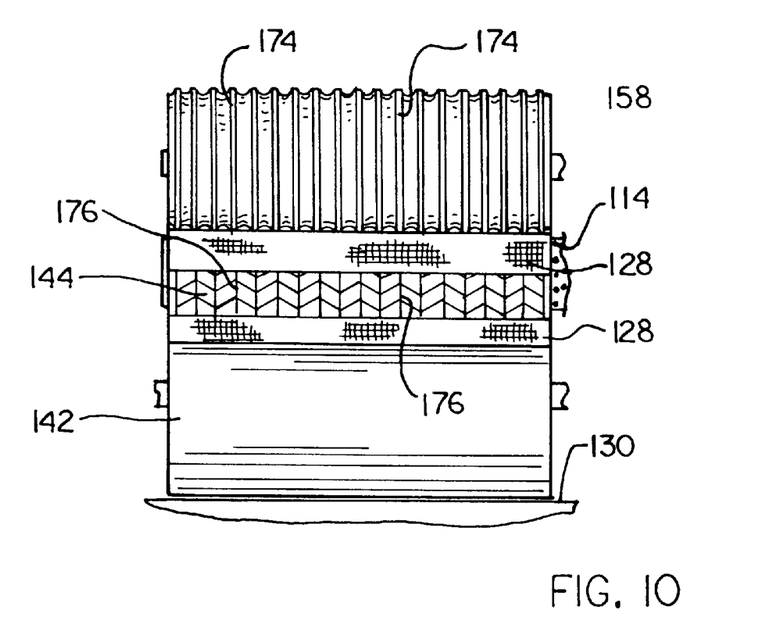
FIG. 10 is a detailed end view of the wrapping and sealing station, with a tube being wrapped.

Wrapping and sealing station 106 as shown in the embodiment is designed to wrap two tubes simultaneously, and thus is comprised of two units that perform in the same manner. Station 106 includes a pair of spaced, parallel transfer rollers 140 and 142 positioned transverse to conveyor 130 to transfer sheets 128 from conveyor 130 to tubes 144 carried on mandrels 114. The interior of rollers 140 and 142 communicate with a vacuum source, not shown, by way of vacuum line 146 and 148, respectively. Each transfer roller includes a porous surface so that sheets from conveyor 48 are held against rollers 140 and 142 until engaging the surface of the tube on mandrel 114.

Each mandrel 114 includes a freely rotatable, continuous hollow cylinder 150 extending from an inner end toward table 110 to a free distal end. A plurality of axially aligned, spaced rows of perforations 152 extend through cylinder 150 into its interior. Perforations 150 increase in diameter from the inner end toward the distal end of cylinder 150, so that a uniform vacuum can be drawn on the surface of cylinder 150 when a vacuum is applied to the interior of the mandrel through vacuum line 154, extending to a vacuum source, not shown.

Wrapping and sealing station 106 also includes a pair of parallel, driven, heated, sealing rollers 156 and 158, positioned parallel to transfer rollers 140 and 142. Sealing rollers 156 and 158 are positioned on a S hydraulically controlled reciprocal frame 160 adapted to move the periphery of rollers 156 and 158 into engagement with the peripheries of tubes 144 carried on mandrels 114 adjacent transfer rollers 140 and 142, respectively. Rollers 156 and 158 will be described in greater detail, hereinafter.

Tubes 144 to be carried on mandrels 114 to wrapping and sealing station 106 are fed from a tube feeder 162, which may be loaded with tubes by hand, or from a supply source, such as an inclined delivery surface, not shown A pair of tube pushers 164 and 166 push tubes from feeder 162 onto mandrels 114 at loading station 104.

Tube discharge station 108, includes tube retractors 168 and 170 positioned to withdraw covered tubes from mandrels 114. The covered tubes can then be discharged or carried to a desired location.

Heated rollers 156 and 158 include equally spaced, circumferential ridges, 172 and 174, respectively, to engage rings 176 on tube 144.

In operation of the embodiment shown if FIGS. 7–11, tubes 144 are loaded onto mandrels 114 at tube loading station 104, by pushing the tubes from tube feeder 162 onto mandrels 114 with tube pushers 164 and 166. The tubes supporting mandrels are then indexed to wrapping and sealing station 106.

Covering material is withdrawn from roll 122 and cut into rectangular sheets 128, which are carried on conveyor 130 to transfer rollers 140 and 142. During conveying, sheets 128 are held onto the surface of conveyor band 136 with a vacuum drawn inwardly through band 136 by vacuum chamber 138.

At wrapping and sealing station 106, sheets 128 are conveyed into engagement with transfer rollers 140 and 142, which are rotated in a counter-clockwise direction. A vacuum is drawn on the interior of rollers 140 and 142 to lift sheets 128 from conveyor 130. Sheets 128 are then carried into engagement with the periphery of tubes 144, where the sheets are drawn against tubes 144 by a vacuum inside tubes 144.

Sealing rollers 156 and 158 are then lowered into contact with tubes 144 and rotated in a counter-clockwise direction, rotating tubes 144 in a clockwise direction. As the surfaces of tubes 144 are brought into engagement with the heated surfaces of rollers 156 and 158, sheets 128 are melted onto tubes 144 between ridges 172 of roller 156 and ridges 174 of roller 158, and rings 176 of tubes 144. When wrapping of sheets 128 is completed, the leading and trailing edges of sheet 128 overlap. The wrapped and sealed tubes are then indexed to tube discharge station 108, where the tubes are retracted from mandrels 114. Empty mandrels 114 then indexed back to loading station 104.

It has surprisingly been found that the performance of the covering is significantly improved when the covering is wrapped counter-clockwise, i.e in the opposite direction of the direction the yarn was wrapped on the tube. For example, tubes covered as taught by U.S. Pat. No. 4,621,508 to Baxley, Jr., which are in the conventional clockwise direction, i.e. in the same direction in which the yarn was wrapped, were more likely to cause yarn breakage during offwinding due to entanglement with the leading edge of the filter covering than tubes wrapped in the direction of the present invention.

It has also surprisingly been found that the performance of the covering is significantly improved when the covering does not extend the full length of the tube, i.e. at least a portion of one end of the tube is left uncovered. For example, tubes covered substantially completely were more likely to cause yarn breakage during offwinding than tubes leaving a portion of one end of the tube unwrapped. In the preferred embodiment, the female end of the tube has about a one inch unwrapped portion.

Certain modifications and improvements will occur to those skilled in the art upon a reading of the foregoing description. By way of example, the turntable could only include two positions, with loading and wrapping being done at the first position, and sealing and unloading being done at the second position. Also, other specific mechanisms can be used for loading, tube positioning, wrapping, sealing, and unloading, so long as the objectives of the present invention are achieved. It should be understood that all such modifications and improvements have been deleted herein for the sake of conciseness and readability but are properly within the scope of the following claims.

We claim:

1. An apparatus for covering a textile dye tube with a thermoplastic filter sheet, said apparatus comprising:

(a) a hollow mandrel for supporting said tube, at least a portion of the outer surface of said mandrel having a plurality of openings;

(b) a vacuum source connected to said mandrel for drawing said sheet against said mandrel, said vacuum source including a vacuum chamber extending from said sheet wrapping and sealing station, said vacuum chamber drawing a vacuum inside said mandrel at and between wrapping and sealing positions;

(c) sealing means for bonding the overlapping edges of said sheet to one another and to said tube, said sealing means including a heated roller movable between a retracted position and an extended position in contact with said sheet wrapped tube, said sealing means including a sealer at said sealing position for sealing said sheet around the circumference of said tube;

(d) means for wrapping said sheet around said tube in a direction opposite to the direction the yarn is wrapped, thereby significantly reducing snagging of the yarn on the overlapping edges of the sheet when the yarn is unwrapped;

(e) a mandrel support table having a tube loading station, a sheet wrapping and sealing station, and a discharge rotation;

(f) table drive means for indexing said mandrel sequentially to each of said stations;

(g) a tube feeder for feeding tubes to said tube loading station; and (h) a sheet feeder for feeding sheets of filter material to said wrapping position.

2. The apparatus according to claim 1, further including a mandrel drive means for rotating said mandrel at said wrapping station to wrap said sheet around the circumference of said tube.

3. The apparatus according to claim 1, further including means for allowing said mandrel to rotate when said mandrel is indexed from said wrapping position to said sealing position.

4. The apparatus according to claim 1, including four mandrels adapted to sequentially move to each of said stations.

5. The apparatus according to claim 1, wherein said table is positioned to rotate in a vertical plane, with said mandrel being positioned horizontally on said table.

6. The apparatus according to claim 1, further including a sheet feeder positioned to convey said sheet of filter material to said tube, said sheet having spaced leading and trailing edges positioned parallel to the axis of said tube, said edges being spaced at a distance greater than the circumference of said tube.

7. The apparatus according to claim 6, wherein said sheet feeder includes a conveyor having a movable sheet support surface with a discharge end at said tube wrapping station and a vacuum source beneath said surface.

8. The apparatus according to claim 7, wherein said sheet feeder further includes a supply roller for supporting a roll of filter material, a feed roller for withdrawing said filter material from said roller, and a cutter for cutting said filter material into said sheets.

9. The apparatus according to claim 1, wherein said tube feeder includes a tube conveyor and an ejector adapted to eject a tube from said conveyor onto said mandrel when said mandrel is indexed to said tube loading station.

10. The apparatus according to claim 1, wherein said roller is ridged, whereby said roller contacts said sheet wrapped tube at a plurality of spaced areas.

11. The apparatus according to claim 10, wherein said dye tubes include spaced circumferential ridges and said roller is positioned to contact said sheet wrapped tube on said ridges.

12. The apparatus according to claim 1, wherein said roller is heated to a temperature sufficient to melt said sheet.

13. The apparatus according to claim 12, wherein said roller is heated to a temperature of between about 400° F. and 450° F. to attach said sheet to said tube.

* * * * *

UNITED STATES PATENT AND TRADEMARK OFFICE
CERTIFICATE OF CORRECTION

PATENT NO. : 5,910,228
DATED : June 8, 1999
INVENTOR(S) : Leon Eric Atkinson et al.

It is certified that error appears in the above-indentified patent and that said Letters Patent is hereby corrected as shown below:

In Claim 1, section (e), line 3, "rotation" should be --station--.

Signed and Sealed this

Second Day of November, 1999

Attest:

Attesting Officer

Q. TODD DICKINSON

Acting Commissioner of Patents and Trademarks